(12) United States Patent
Iida et al.

(10) Patent No.: US 9,389,352 B2
(45) Date of Patent: Jul. 12, 2016

(54) RETARDATION FILM AND PRODUCTION METHOD THEREFOR, POLARIZING PLATE, AND DISPLAY DEVICE

(71) Applicants: Toshiyuki Iida, Ibaraki (JP); Takashi Shimizu, Ibaraki (JP); Nao Murakami, Ibaraki (JP)

(72) Inventors: Toshiyuki Iida, Ibaraki (JP); Takashi Shimizu, Ibaraki (JP); Nao Murakami, Ibaraki (JP)

(73) Assignee: Nitto Denko Corportation, Osaka (JP)

( * ) Notice: Subject to any disclaimer, the term of this patent is extended or adjusted under 35 U.S.C. 154(b) by 80 days.

(21) Appl. No.: 14/381,159

(22) PCT Filed: Jan. 10, 2013

(86) PCT No.: PCT/JP2013/050279
§ 371 (c)(1),
(2) Date: Aug. 26, 2014

(87) PCT Pub. No.: WO2013/128954
PCT Pub. Date: Sep. 6, 2013

(65) Prior Publication Data
US 2015/0029587 A1    Jan. 29, 2015

(30) Foreign Application Priority Data

Feb. 27, 2012  (JP) ................................ 2012-040499

(51) Int. Cl.
*G02B 5/30* (2006.01)
*G02B 27/28* (2006.01)
(Continued)

(52) U.S. Cl.
CPC .............. *G02B 5/3083* (2013.01); *B29C 55/00* (2013.01); *B29C 55/08* (2013.01); *C08J 5/18* (2013.01);
(Continued)

(58) Field of Classification Search
CPC ........ G02B 5/208; G02B 5/22; G02B 5/3083; G02B 5/3091; G02B 5/32; G02B 27/286; G02B 1/04; G02B 5/3033; B29C 55/00; B29C 55/08

USPC .............. 359/352, 361, 489.04, 489.07, 900; 427/163.1
See application file for complete search history.

(56) References Cited

U.S. PATENT DOCUMENTS 5,245,456 A   9/1993   Yoshimi et al.
7,643,118 B2   1/2010   Nagase et al.
(Continued)

FOREIGN PATENT DOCUMENTS

CN   101 065 691   10/2007
CN   101 147 086   3/2008
(Continued)

*Primary Examiner* — Ricky D Shafer
(74) *Attorney, Agent, or Firm* — Vedder Price P.C.

(57) ABSTRACT

Provided is a producing method for a retardation film with a reverse wavelength dispersion property, which is highly reliable in terms of a small wavelength dispersion change and is low in display unevenness due to a position dependence of a retardation variation. The production method is designed for a retardation film which satisfies the following formulas (1) and (2):

$$0.7 < Re_1[450]/Re_1[550] < 0.97 \quad (1);$$

and $$1.5 \times 10^{-3} < \Delta n < 6.0 \times 10^{-3} \quad (2)$$

(where: $Re_1[450]$ and $Re_1[550]$ represent, respectively, in-plane retardation values thereof as measured by using light of a wavelengths of 450 nm and light of a wavelength of 550 nm, at 23° C.; and $\Delta n$ represents an in-plane birefringence thereof as measured by using light of a wavelength of 550 nm). This method comprises: a step of continuously conveying and supplying a long polymer film; a stretching step of stretching the polymer film in a direction transverse to a conveyance direction; a first shrinkage step of, after the stretching step, causing the polymer film to shrink in the transverse direction; and a second shrinkage step of, after the first shrinkage step, causing the polymer film to shrink in the transverse direction, wherein a shrinkage temperature $T_1$ (° C.) in the first shrinkage step and a shrinkage temperature $T_2$ (° C.) in the second shrinkage step satisfy the following formula (3):

$$1 < (T_1 - T_2) \le 10 \quad (3).$$

11 Claims, 2 Drawing Sheets

(51) Int. Cl.
  *B29C 55/00* (2006.01)
  *B29C 55/08* (2006.01)
  *C08J 5/18* (2006.01)
  *G02B 1/04* (2006.01)
  *B29D 11/00* (2006.01)
  *B29K 101/00* (2006.01)
  *B29L 11/00* (2006.01)

(52) U.S. Cl.
  CPC ............... *G02B 1/04* (2013.01); *G02B 5/3033* (2013.01); *G02B 27/286* (2013.01); *B29D 11/00644* (2013.01); *B29D 11/00951* (2013.01); *B29K 2101/00* (2013.01); *B29K 2995/0032* (2013.01); *B29L 2011/0066* (2013.01); *C08J 2329/04* (2013.01); *C08J 2345/00* (2013.01); *C08J 2369/00* (2013.01)

(56) References Cited

U.S. PATENT DOCUMENTS

| | | | |
|---|---|---|---|
| 8,293,861 B2 | 10/2012 | Motoyoshi et al. | |
| 8,455,611 B2 | 6/2013 | Motoyoshi et al. | |
| 8,697,201 B2 | 4/2014 | Kawai et al. | |
| 2003/0138654 A1* | 7/2003 | Kido | C08J 5/18 428/521 |
| 2006/0132688 A1* | 6/2006 | Yoda | G02F 1/133634 349/119 |
| 2006/0177607 A1* | 8/2006 | Ohmori | C08J 5/18 428/1.31 |
| 2007/0211199 A1* | 9/2007 | Kobayashi | G02F 1/133528 349/117 |
| 2008/0113116 A1 | 5/2008 | Hiraike et al. | |
| 2008/0151373 A1* | 6/2008 | Sekiguchi | G02B 5/3083 359/487.05 |
| 2009/0109385 A1 | 4/2009 | Nagase et al. | |
| 2009/0116109 A1 | 5/2009 | Konishi et al. | |
| 2009/0128747 A1* | 5/2009 | Sugiyama | B29C 55/06 349/96 |
| 2009/0273837 A1 | 11/2009 | Kawai et al. | |
| 2011/0288261 A1 | 11/2011 | Motoyoshi et al. | |
| 2013/0005939 A1 | 1/2013 | Motoyoshi et al. | |
| 2013/0249378 A1 | 9/2013 | Murakami et al. | |
| 2014/0268333 A1 | 9/2014 | Tanaka et al. | |
| 2014/0285888 A1 | 9/2014 | Tanaka et al. | |

FOREIGN PATENT DOCUMENTS

| | | |
|---|---|---|
| CN | 100 579 993 | 1/2010 |
| CN | 102 227 657 | 10/2011 |
| EP | 2 757 394 | 7/2014 |
| EP | 2 757 395 | 7/2014 |
| JP | 2846418 | 2/1992 |
| JP | 1997110775 | 4/1997 |
| JP | 2006117792 | 5/2006 |
| JP | 2007-161994 | 6/2007 |
| JP | 2009086651 | 4/2009 |
| JP | 2010-134232 | 6/2010 |
| JP | 2010-230832 | 10/2010 |
| JP | 2013-076981 | 4/2013 |
| JP | 2013-076982 | 4/2013 |
| TW | 2006-24447 | 7/2006 |
| TW | 2006-39455 | 11/2006 |
| TW | 2008-07109 | 2/2008 |
| WO | WO 2006-057309 | 6/2006 |
| WO | WO 2012-077663 | 6/2012 |
| WO | WO 2013-039178 | 3/2013 |
| WO | WO 2013-039179 | 3/2013 |

* cited by examiner

RETARDATION FILM AND PRODUCTION METHOD THEREFOR, POLARIZING PLATE, AND DISPLAY DEVICE

TECHNICAL FIELD

The present invention relates to a retardation film, a production method therefor, and a polarizing plate and a display device each having the retardation film. In particular, the present invention relates to a retardation film with a reverse wavelength dispersion property, which is highly reliable because of a small change in terms of wavelength dispersion and is low in display unevenness due to a position dependence of retardation variation (variation in retardation value), and a production method for the retardation film, based on stretching a polymer film.

BACKGROUND ART

Late years, along with popularization of displays, a level of performance required for an optical film for use therein has become increasingly higher. In order to meet the requirement, there is a need for developing an optical film by utilizing a new material and a new process.

As one type of optical film, there is a retardation film. Properties of the retardation film include a wavelength dependence of a retardation value, and a type having a property in which a retardation value becomes larger as measured by using light having a longer wavelength (this property will hereinafter be also referred to as "reverse wavelength dispersion property") has been developed.

Japanese Patent Application No. 2010-271860 discloses a technique of improving brittleness of a retardation film, particularly, a retardation film with a reverse wavelength dispersion property, from the standpoint of runnability, processability, product reliability, etc, in order to produce a large number of a wide and thin film, or the like.

JP 2009-086651A discloses a technique intended to, by using a retardation film which has a low melt viscosity and a low environmental load and exhibits excellent flowability, formability, heat resistance, long term stability in retardation value, and wavelength dispersion property, provide a circularly polarizing plate and a display device capable of creating high contract even when viewed obliquely and realizing good display without becoming bluish.

However, in these literatures, no discussion is made about display unevenness due to a phenomenon that a retardation variation of a retardation film used, e.g., in a polarizing plate for a display device, varies depending on position in the retardation film, in a situation where the retardation film is exposed to high-temperature conditions, e.g., during use of the display device, over a long period of time.

CITATION LIST

Patent Literature

Patent Literature 1: Japanese Patent Application No. 2010-271860
Patent Literature 2: JP 2009-086651A

SUMMARY OF INVENTION

Technical Problem

The present invention was triggered by a first finding that, in a situation where a retardation film is laminated to glass through a pressure-sensitive adhesive, and, in this state, exposed to high-temperature conditions over a long period of time, a retardation value increases in a central region of the retardation film, whereas the retardation value decreases in an edge region of the retardation film, and the presence of such a position dependence in a retardation variation causes display unevenness. Then, the present invention has been accomplished based on a finding that the display unevenness problem can be solved by controlling a change in wavelength dispersion of a retardation film before and after a high-temperature treatment to fall within a given range, and employing a given multi-stage shrinkage step in a retardation film production method.

Solution to Technical Problem

According to one aspect of the present invention, there is provided a method of producing a retardation film, wherein the retardation film satisfies the following formulas (1) and (2):

$$0.7 < Re_1[450]/Re_1[550] < 0.97 \quad (1);$$

and $$1.5 \times 10^{-3} < \Delta n < 6.0 \times 10^{-3} \quad (2)$$

(where: $Re_1[450]$ and $Re_1[550]$ represent, respectively, in-plane retardation values of the retardation film as measured by using light of a wavelength of 450 nm and light of a wavelength of 550 nm, at 23° C.; and $\Delta n$ represents an in-plane birefringence of the retardation film as measured by using light of a wavelength of 550 nm). The method comprises: a step of continuously conveying and supplying a long polymer film; a stretching step of stretching the polymer film in a direction transverse to a conveyance direction; a first shrinkage step of, after the stretching step, causing the polymer film to shrink in the transverse direction; and a second shrinkage step of, after the first shrinkage step, causing the polymer film to shrink in the transverse direction, wherein a shrinkage temperature $T_1$ (° C.) in the first shrinkage step and a shrinkage temperature $T_2$ (° C.) in the second shrinkage step satisfy the following formula (3):

$$1 < (T_1 - T_2) \leq 10 \quad (3).$$

In one embodiment of the present invention, the above method further comprises a third shrinkage step of, after the second shrinkage step, causing the polymer film to shrink in the transverse direction, wherein the shrinkage temperature $T_2$ (° C.) in the second shrinkage step and a shrinkage temperature $T_3$ (° C.) in the third shrinkage step satisfy the following formula (4):

$$1 < (T_2 - T_3) \leq 10 \quad (4).$$

In another embodiment of the present invention, a stretching temperature $T_0$ (° C.) in the stretching step and the shrinkage temperature $T_1$ (° C.) in the first shrinkage step satisfy the following formula (5):

$$0 \leq (T_0 - T_1) \leq 10 \quad (5).$$

In yet another embodiment of the present invention, each of the shrinkage temperature $T_1$ (° C.) in the first shrinkage step, the shrinkage temperature $T_2$ (° C.) in the second shrinkage step and the shrinkage temperature $T_3$ (° C.) in the third shrinkage step satisfies the following formula (6):

$$(Tg-20) < T < (Tg+3) \quad (6)$$

(where: Tg represents a glass-transition temperature of the polymer film; and T represents $T_1$, $T_2$ or $T_3$).

According to another aspect of the present invention, there is provided a retardation film obtained by the above method, wherein the retardation film satisfies the following formula (7):

$$2° < (\text{a maximum value of an orientation angle} - \text{a minimum value of the orientation angle}) < 10° \quad (7).$$

According to yet another aspect of the present invention, there is provided a retardation film obtained by the above method, wherein the retardation film satisfies the following formula (8):

$$|Re_1[450]/Re_1[550] - Re_2[450]/Re_2[550]| < 0.02 \quad (8)$$

(where: $Re_1[450]$ and $Re_1[550]$ represent, respectively, in-plane retardation values of the retardation film as measured by using light of a wavelength of 450 nm and light of a wavelength of 550 nm, at 23° C.; and $Re_2[450]$ and $Re_2[550]$ represent, respectively, in-plane retardation values of the retardation film as measured by using light of a wavelengths of 450 nm and light of a wavelength of 550 nm, at 23° C., and after subjecting the retardation film to a heat treatment at 90° C. for 100 hours.

According to still another aspect of the present invention, there is provided a retardation film which satisfies the following formulas (1), (2) and (8):

$$0.7 < Re_1[450]/Re_1[550] < 0.97 \quad (1),$$

$$1.5 \times 10^{-3} < \Delta n < 6.0 \times 10^{-3} \quad (2),$$

$$|Re_1[450]/Re_1[550] - Re_2[450]/Re_2[550]| < 0.02 \quad (8)$$

(where $Re_1[450]$ and $Re_1[550]$ represent, respectively, in-plane retardation values of the retardation film as measured by using light of a wavelengths of 450 nm and light of a wavelength of 550 nm, at 23° C.; $\Delta n$ represents an in-plane birefringence of the retardation film as measured by using light of a wavelength of 550 nm; and $Re_2[450]$ and $Re_2[550]$ represent, respectively, in-plane retardation values of the retardation film as measured by using light of a wavelengths of 450 nm and light of a wavelength of 550 nm, at 23° C., and after subjecting the retardation film to a heat treatment at 90° C. for 100 hours.

In one embodiment of the present invention, the above retardation film satisfies the following formula (7):

$$2° < (\text{a maximum value of an orientation angle} - \text{a minimum value of the orientation angle}) < 10° \quad (7).$$

In another embodiment of the present invention, the above retardation film contains a polymer material including, as a primary component, a polymer comprising a main chain having a stretch-orientation property and a side chain comprised of a unit having an absorption edge at a wavelength of 260 to 380 nm, wherein a plane of the side chain intersects with a direction along which the main chain extends.

According to yet still another aspect of the present invention, there is provided a polarizing plate comprising the above retardation film and a polarizer, and a display device comprising this polarizing plate.

The polarizing plate may be a linearly polarizing plate or a circularly polarizing plate. The display device may be an OLED display device.

DESCRIPTION OF EMBODIMENTS

<1. Retardation Film>

Figure 1:
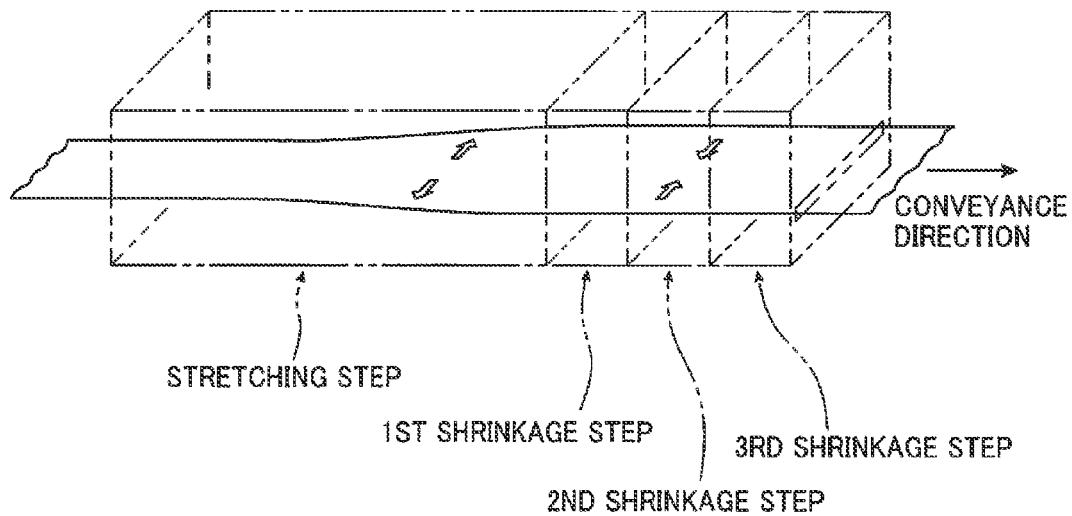
FIG. 1 is a schematic diagram of a stretching step and a shrinkage step in one embodiment of the present invention.

A retardation film of the present invention is a type which is to be obtained typically by subjecting a polymer film to stretching. As used in this specification, the term "retardation film" means a type having a birefringence in an in-plane and/or thickness directions thereof.

As used in this specification, $Re_1[550]$ represents an in-plane retardation value of a retardation film before being subjected to an aftermentioned heat treatment, as measured by using light of a wavelength of 550 nm, at 23° C. $Re_1[550]$ can be obtained by the following formula: $Re_1[550]=(nx-ny)\times d$, where: nx and ny represent, respectively, refractive indexes in a slow axis direction and a fast axis direction of the retardation film at a wavelength of 550 nm; and d (nm) is a thickness of the retardation film. The term "slow axis" herein means a direction causing an in-plane refractive index to be maximized. Except that the measurement is performed by using light of a wavelength of 450 nm, $Re_1[450]$ is defined in the same manner as $Re_1[550]$.

The retardation film of the present invention satisfies the following relationship: $0.7 < Re_1[450]/Re_1[550] < 0.97$.

A ratio of $Re_1[450]$ to $Re_1[550]$ ($Re_1[450]/Re_1[550]$) of the retardation film of the present invention is preferably in the range of 0.75 to 0.95. For example, when the retardation film is used in a display panel device, more excellent display properties can be obtained by setting $Re_1[450]/Re_1[550]$ in the above range.

In the retardation film having such a wavelength dispersion property, as long as the ratio falls within the above range, a larger retardation is developed along with an increase in wavelength, so that an ideal retardation property can be obtained at each wavelength in the visible region. For example, when used in an organic EL display, a retardation film having such a wavelength dependence may be prepared as a λ/4 plate, and then laminated to a polarizing plate to prepare a circularly polarizing plate. In this case, it becomes possible to realize a neutral polarizing plate and display device having a low wavelength dependence of reflected hue. On the other hand, if the ratio falls outside the above range, the wavelength dependency of hue becomes larger, thereby causing a coloring problem in a polarizing plate and a display device. Moreover, when used in a liquid crystal display, it is possible to improve a phenomenon that light leak occurs when viewed from different angles, or a phenomenon that a display image becomes bluish (this phenomenon will hereinafter be also referred to as "bluish phenomenon").

As used in this specification. $Re_2[450]$ and $Re_2[550]$ are defined in the same manner, respectively, as $Re_1[450]$ and $Re_1[550]$, except that the measurement is performed after subjecting the retardation film to a heat treatment at 90° C. for 100 hours.

The retardation film of the present invention satisfies the following relationship: $|Re_1[450]/Re_1[550] - Re_2[450]/Re_2[550]| < 0.02$. The retardation film of the present invention preferably satisfies the following relationship: $|Re_1[450]/Re_1[550] - Re_2[450]/Re_2[550]| < 0.017$, and more preferably satisfies the following relationship: $|Re_1[450]/Re_1[550] - Re_2$

|[450]/Re$_2$[550]|<0.015. If the above relationship is not satisfied, coloring occurs in a reflected hue, resulting in color unevenness.

Preferably, in the retardation film, the in-plane retardation value as measured by using light of a wavelength of 550 nm at 23° C. (Re$_1$[550]) is less than an in-plane retardation value as measured by using light of a wavelength of 650 nm at 23° C. (Re$_1$[650]). In the retardation film having such a wavelength dispersion property, the retardation value becomes constant in a red wavelength region, so that, for example when used in a liquid crystal display, it is possible to improve the phenomenon that light leak occurs when viewed from different angles, or a phenomenon that a display image becomes reddish (this phenomenon will hereinafter be also referred to as "reddish phenomenon").

A ratio of Re$_1$[650] to Re$_1$[550](Re$_1$[650]/Re$_1$[550]) is preferably greater than 1, more preferably in the range of 1.01 to 1.20, particularly preferably in the range of 1.02 to 1.15. For example, when the retardation film is used in an organic EL display, more excellent display properties can be obtained by setting Re$_1$[650]/Re$_1$[550] in the above range.

The in-plane retardation values of the retardation film can be measured by "AxoScan" (trade name; produced by Axometrics, Inc.).

As used in this specification, Δn represents an in-plane birefringence (nx−ny) as measured by using light of a wavelength of 550 nm.

The retardation film of the present invention satisfies the following relationship: $1.5 \times 10^{-3} < \Delta n < 6.0 \times 10^{-3}$.

The in-plane birefringence Δn is preferably in the range of $1.5 \times 10^{-3}$ to $5.0 \times 10^{-3}$, more preferably in the range of $2.0 \times 10^{-3}$ to $4.5 \times 10^{-3}$. The Δn may be adjusted to fall within the above range by configuring a stretching step in production of the retardation film to comprise fixed-end stretching, such as transverse stretching or oblique stretching, and adjusting a stretching ratio, a stretching temperature, a stretching speed, etc., during the stretching step. In this case, it becomes possible to produce a wider retardation film than ever before to thereby cope with a large-screen display and achieve low-cost design based on effective utilization of materials. In some situations, with a view to facilitating the adjustment of the Δn based on stretching, film-forming conditions, such as temperature, speed and/or thickness, can be appropriately changed. If the Δn falls outside the above range, retardation developability is deteriorated, and it becomes impossible to sufficiently perform the widthwise stretching. In contrast, when the Δn falls within the above range, it becomes easier to adjust the retardation to an appropriate value, so that it becomes possible to perform retardation design conforming to an intended display device to thereby provide a display device excellent in optical properties in a normal direction and viewing angle properties. In addition, when the Δn falls within the above range, it becomes easier to design a retardation film to have a significantly small thickness, and incorporate the retardation film into a thinned display device. On the other hand, if the Δn is less than the above range, it becomes necessary to excessively increase the film thickness.

The retardation film of the present invention preferably satisfies the following relationship: 2°<(a maximum value of an orientation angle thereof−a minimum value of the orientation angle)<10°. If the difference obtained by subtracting the minimum value of the orientation angle from the maximum value of the orientation angle is equal to or greater than 10°, coloring, e.g., the bluish phenomenon or the reddish phenomenon, occurs. If the difference is equal to or less than 2°, it becomes impossible to induce a sufficient shrinkage, resulting in poor durability.

The retardation film of the present invention has a given thickness-directional retardation value Rth. The thickness-directional retardation value can be obtained by the following formula: Rth=(nx−nz)×d, where: nx and nz represent, respectively, refractive indexes in the slow axis direction and the thickness direction of the retardation film; and d (nm) is the thickness of the retardation film. The term "slow axis" herein means a direction causing an in-plane refractive index to be maximized, as mentioned above.

Regarding an in-plane retardation Re (=(nx−ny)×d) of the retardation film, a suitable value may be appropriately selected according to its intended use. The Re may be set to 10 nm or more, preferably in the range of 50 nm to 500 nm. For example, in the case where the retardation film is used as a λ/2 plate, the Re is set preferably in the range of 200 nm to 400 nm, more preferably in the range of 250 nm to 290 nm. On the other hand, in the case where the retardation film is used as a λ/4 plate, the Rth is set preferably in the range of 100 nm to 200 nm, more preferably in the range of 130 nm to 150 nm.

The retardation film of the present invention may be a type having a specific ratio NZ (also referred to as "Nz coefficient") of a given thickness-directional birefringence (nx−nz) to an in-plane birefringence (nx−ny).

For example, generally, in longitudinal stretching, when a film is stretched in a longitudinal direction thereof, widthwise shrinkage occurs, because it is not fixed in a width direction thereof. Therefore, molecules will be oriented more in a uniaxial direction, and refractive indexes nx, ny, nz have, for example, the following relationship: nx>ny=nz. In this case, folding endurance in the longitudinal direction of the film corresponding to a stretching direction is increased, whereas folding endurance in the width direction of the film is significantly reduced. In order to solve this situation, under a condition that a force of restricting a width dimension of a film is generated in an angular direction intersecting with a stretching direction (for example, in transverse uniaxial stretching, under a condition that a force for allowing a length of a film in its longitudinal direction perpendicular to a width direction of the film corresponding to a stretching direction to be maintained constant is generated), the film is subjected to stretching, so that molecules can be oriented in not only the stretching direction but also the angular direction intersecting with the stretching direction, and the refractive indexes nx, ny, nz can be set to have the following relationship: nx>ny>nz. This makes it possible to achieve both the folding endurances in the stretching direction and the folding endurance in the width direction, at high levels.

A transmittance of the retardation film of the present invention is set preferably to 80% or more, more preferably to 85% or more, particularly preferably to 89% or more.

<2. Retardation Film Production Method>

The retardation film of the present invention is prepared by molecularly orientating a polymer film through stretching.

Specifically, in a retardation film production method of the present invention, first of all, a long polymer film is continuously conveyed and supplied, and stretched in a direction transverse to a conveyance direction.

FIG. 1 is a schematic diagram of a stretching step and a shrinkage step in one embodiment of the present invention.

<2.1 Stretching Step>

As means to stretch the above polymer film, any suitable stretching process may be employed depending on the purpose, as long as it is capable of stretching the polymer film in a direction transverse to a conveyance direction of the polymer film. Examples of the stretching process suitable for the present invention include a transverse uniaxial stretching process, a longitudinal and transverse simultaneous biaxial stretching process, and a longitudinal and transverse sequential biaxial stretching process. As a stretching device, any suitable stretching machine, such as a tenter-type stretching machine or a biaxial stretching machine, may be employed. Preferably, the above stretching machine is equipped with a temperature control means. When stretching is performed under heating, an internal temperature of the stretching machine may be continuously changed, or may be stepwise changed. A stretching step may consist of a single stage, or may be divided into two or more stages. In regard to a stretching direction, it is desirable to perform stretching in the width direction (TD direction) of the film or an oblique direction with respect thereto.

In regard to a temperature at which the polymer film is stretched (stretching temperature), a suitable value may be appropriately selected, depending on the purpose. Preferably, the stretching is performed at a temperature of (Tg−20° C.) to (Tg+30° C.), where Tg represents a glass transition temperature of the polymer film. When this condition is selected, the retardation value is more likely to become uniform, and the film is less likely to become clouded or white. Specifically, the stretching temperature is set in the range of 90° C. to 210° C., more preferably in the range of 100° C. to 200° C., particularly preferably in the range of 100° C. to 180° C. The glass transition temperature may be determined by a DSC method according to JIS K 7121 (1987).

As a device for controlling the stretching temperature, any suitable device may be employed. Examples of the temperature control device include: an air circulation type constant-temperature oven in which hot air or cool air is circulated; a heater using microwave or far infrared rays; and a roller, heat-pipe roller, metal belt or the like heated for temperature adjustment.

In regard to a ratio at which the polymer film is stretched (stretching ratio), a suitable value may be appropriately selected, depending on the purpose. Preferably, the stretching ratio is set in the range of greater than 1 time to 6 times, more preferably in the range of greater than 1.5 times to 4 times, particularly preferably in the range of greater than 2.0 times to 3 times. While a feed speed during stretching is not particularly limited, it is set preferably in the range of 0.5 m/min to 30 m/min, more preferably in the range of 1 m/min to 20 m/min, in view of machine accuracy, stability and others. The above stretching conditions make it possible to obtain intended optical properties and further obtain a retardation film excellent in optical uniformity.

<2.2. Shrinkage Step>

The retardation film production method of the present invention further employs a multi-stage (at least two-stage) shrinkage step. Specifically, in the retardation film production method of the present invention, after the stretching step, a first shrinkage step of causing the polymer film to shrink in a direction opposite to the stretching direction is performed, and, after the first shrinkage step, a second shrinkage step of causing the polymer film to shrink in the same direction as that in the first shrinkage step (in the transverse direction) is performed.

This shrinkage step is performed to relax shrinkage stress accumulated in the stretched film during the stretching step. In the shrinkage step employed in the present invention, it is assumed that only a main chain undergoes stress relaxation, but side chains are less likely to undergo stress relaxation because orientation of the side chains is more firmly fixed by intermolecular interaction. This would make it possible to improve long-term stability.

Further, in the retardation film production method of the present invention, a difference in shrinkage temperature between the preceding-stage shrinkage step and the subsequent-stage shrinkage step is set to fall within a given range. That is, in the retardation film production method of the present invention, a shrinkage temperature $T_1$ (° C.) in the first shrinkage step and a shrinkage temperature $T_2$ (° C.) in the second shrinkage step have a relationship satisfying the following formula: $1<(T_1-T_2)\leq 10$. Preferably, they have a relationship satisfying the following formula: $1<(T_1-T_2)\leq 5$.

The retardation film production method of the present invention may employ an additional shrinkage step. That is, in the retardation film production method of the present invention, after the second shrinkage step, a third shrinkage step of causing the polymer film to shrink in the same direction as that in the second shrinkage step (in the transverse direction) may be performed.

In this case, the shrinkage temperature $T_2$ (° C.) in the second shrinkage step and a shrinkage temperature $T_3$ (° C.) in the third shrinkage step have a relationship satisfying the following formula: $1<(T_2-T_3)\leq 10$. Preferably, they have a relationship satisfying the following formula: $1<(T_2-T_3)\leq 5$.

Preferably, in the retardation film production method of the present invention, a stretching temperature $T_0$ (° C.) in the stretching step and the shrinkage temperature $T_1$ (° C.) in the first shrinkage step have a relationship satisfying the following formula: $0\leq(T_0-T_1)\leq 10$.

Preferably, in the retardation film production method of the present invention, the shrinkage temperature in each of the shrinkage steps has a given relationship with a glass-transition temperature Tg of the polymer film. Specifically, each of the shrinkage temperature $T_1$ (° C.) in the first shrinkage step, the shrinkage temperature $T_2$ (° C.) in the second shrinkage step and the shrinkage temperature $T_3$ (° C.) in the third shrinkage step satisfies the following formula: $(Tg-20)<T<(Tg+3)$, where T represents $T_1$, $T_2$ or $T_3$.

In the retardation film production method of the present invention, a shrinkage rate is preferably in the range of 0.5% to 7%, more preferably in the range of 1% to 5%, wherein the shrinkage rate is defined by the following formula: [(maximum inter-chuck distance after stretching−inter-tenter chuck distance after shrinkage)/(maximum inter-chuck distance after stretching)]×100.

The retardation film production method of the present invention having the above feature makes it possible to obtain a retardation film satisfying the following formula: $|Re_1[450]/Re_1[550]-Re_2[450]/Re_2[550]|<0.02$ (wherein each variable is defined as above).

<3. Use of Retardation Film>

The retardation film of the present invention is useable for any suitable use. Typical examples of the use include a λ/4 plate, a λ/2 plate, and an optical compensation film for a liquid crystal display. The remaining examples include an anti-reflection film for flat panel displays such as a liquid crystal display, an organic EL display, and a plasma display.

<4. Polymer Film to be Used for Retardation Film>

As the retardation film of the present invention, it is possible to use a stretched film of a polymer film consists primarily of a thermoplastic resin. It is preferable to use a stretched film of a polymer film such as a film of an aliphatic polymer composed of a copolymer, wherein the polymer film consists primarily of a polymer which comprises a main chain having a stretch-orientation property, and a side chain comprised of a unit having an absorption edge at a wavelength of 260 to 380 nm, and wherein a plane of the side chain intersects with a direction along which the main chain extends. It is more preferable to use a stretched film of a polymer film consisting primarily of a high-molecular-weight component which comprises a segment introduced to construct a long rigid cyclic structure or crystalline structure in a main chain direction, and, in a side chain, an aromatic group having an absorption edge wavelength of 260 nm to 380 nm, wherein the polymer film is made of a resin, such as a cellulose-based resin, a polyester-based, polyvinyl alcohol-based, polyvinyl acetal-based, polycarbonate-base, polyamide-based, polyimide-based, polyether sulfone-based, polyether-based, polysulfone-based, polystyrene-based, polynorbornene-based, polyolefin-based, acrylic-based, urethane-based, acrylic urethane-based or acetate-based transparent resin. In this high-molecular-weight component, the segment and the aromatic group may be in a copolymerized state, or may be in a blended state.

In order to impart the reverse wavelength dispersion property to the polymer film, a unit for causing a steep change in wavelength dispersion of birefringence may be introduced as a side chain. For this purpose, at least one aromatic group may be introduced as a side chain. If a wavelength of an absorption edge is greater than 380 nm, the absorption edge enters the visible region, causing a problem of coloring, etc. On the other hand, if the absorption edge is set on a short wavelength side with respect to 260 nm, the wavelength dispersion of birefringence by the side chain section comes close to flat dispersion, so that the wavelength dispersion property of the high-molecular-weight component becomes gentle. Therefor, it is considered that, when the side chain has an aromatic group whose absorption edge wavelength is in the range of 260 to 380 nm, a wavelength dependence of birefringence based on the side chain becomes steep without the occurrence of the problem of coloring, etc., and the high-molecular-weight component efficiently exhibits the reverse wavelength dispersion property as a whole.

Meanwhile, a photoelastic coefficient generally depends on an aromaticity of a material structure. Specifically, it is low in alicyclic COP-based (cycloolefin-based) polymers, and high in aromatic PC (polycarbonate)-based polymers. Thus, while an aromaticity of the polymer may be enhanced to reduce the photoelastic coefficient, an orientation property is deteriorated in trade-off relation. Therefore, with a view to realizing a high orientation property, it is conceived to introduce a structure having a high orientation property even in an aliphatic polymer, specifically, a segment constructing a long and rigid cyclic structure or crystalline structure in a main chain direction. In a polymer film having a side-chain component whose absorption wavelength is located on a longer wavelength side, the orientation property of the high-molecular-weight component is enhanced.

As used in this specification, the term "stretched film" means a plastic film obtained by applying tension to an un-stretched film or additionally applying tension to a preliminarily-stretched film, at an appropriate temperature, to thereby enhance molecular orientation in a specific direction.

A retardation film according to one embodiment of the present invention contains a polymer having at least a repeating unit represented by the following general formula (I):

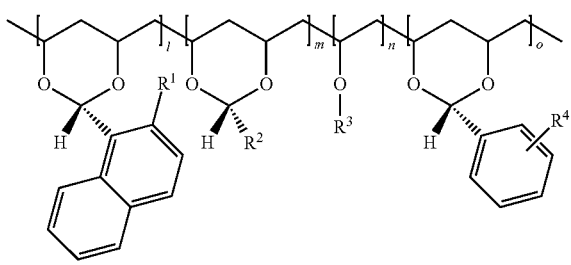
(I)

For example, the above polymer can be obtained by subjecting at least two types of aldehyde compounds and/or ketone compounds, and a polyvinyl alcohol-based resin, to a condensation reaction. In the polymer represented by the general formula (I), an arrangement sequence of basic units l, m, n, o is not particularly limited, but may be an alternate, random or block arrangement.

In the general formula (I), $R_1$ represents a halogen atom, a straight-chain or branched alkyl group having a carbon number of 1 to 4, a straight-chain or branched alkyl halide group having a carbon number of 1 to 4, a straight-chain or branched alkoxy group having a carbon number of 1 to 4, an alkoxycarbonyl group, an acyloxy group, an amino group, an azido group, a nitro group, a cyano group or a hydroxyl group. The $R_1$ is a substituent substituting 2-position of the naphthyl ring. Preferably, the $R_1$ is a methoxy group.

The $R_1$ is used to control steric conformation of the naphthyl ring to which the substituent is bonded. More specifically, it is assumed that, due to steric hindrance, the substituent is more likely to be coordinated between two oxygen atoms in the general formula (1). Thus, a planar structure of the naphthyl ring is oriented substantially perpendicularly to a virtual line connecting the two oxygen atoms. This polymer can be used to obtain a retardation film excellent in transparency and processability.

In the general formula (I), the basic unit; 1 can be obtained, for example, through a condensation reaction between a polyvinyl alcohol-based resin, and 1-naphthaldehydes or 1-naphthones. As the 1-naphthaldehydes, any suitable type may be appropriately employed. Examples thereof include 2-methoxy-1-naphthaldehyde, 2-ethoxy-1-naphthaldehyde, 2-propoxy-1-naphthaldehyde, 2-methyl-1-naphthaldehyde, and 2-hydroxy-1-naphthaldehyde. As the 1-naphthones, any suitable type may be appropriately employed. Examples of the 1-naphthones include 2-hydroxy-1-acetonaphthone, and 8'-hydroxy-1'-benzonaphthone. Among them, 2-methoxy-1-naphthaldehyde is preferable (in this case, in the general formula (I), the $R_1$ is a methoxy group).

The 1-naphthaldehydes can be obtained by any suitable synthesis method. Examples of the synthesis method for the 1-naphthaldehydes include a method which comprises: allowing substituted or un-substituted naphthoic acid to react with any alcohol to form substituted or un-substituted naphthoate ester; and then reducing the naphthoate ester by a reducing agent, such as diisobutylaluminum hydride or hydrogenated bis(2-methoxyethoxy) aluminum sodium, as described, for example, in JP 09-040600A and JP 09-110775A. As the 1-naphthaldehydes, it is possible to use commercially available products, without modification.

The 1-naphthones can be obtained by any suitable synthesis method. Examples of the synthesis method for the 1-naphthones include a method which comprises: allowing substituted or un-substituted naphthoic acid to react with appropriate halide phosphate or thionyl chloride to form acyl halide; and then allowing the acyl halide to further react with an appropriate nucleophilic reagent. Alternatively, a method described in Reference Example 1 in JP 2846418 B2 may also be employed.

In the general formula (I), $R_2$ represents a hydrogen atom, a straight-chain or branched alkyl group having a carbon number of 1 to 4, a substituted or un-substituted cycloalkyl group having a carbon number of 5 to 10, a substituted or un-substituted phenyl group, a substituted or un-substituted naphthyl group, or a substituted or un-substituted heterocyclic group. A polymer having the substituent introduced into the $R_2$ has excellent solubility with respect to an all-purpose solvent (e.g., acetone, ethyl acetate or toluene). Preferably, the $R_2$ is a straight-chain or branched alkyl group having a carbon number of 1 to 4.

In the general formula (I), the basic unit; m can be obtained, for example, through a condensation reaction between a polyvinyl alcohol-based resin and any aldehyde or ketone compound. Examples of the aldehyde compound include formaldehyde, acetaldehyde, 1,1-diethoxyethane (acetal), propionaldehyde, n-butyraldehyde, isobutyraldehyde, cyclohexane carboxyaldehyde, 5-norbornene-2-carboxyaldehyde, 3-cyclohexene-1-carboxyaldehyde, dimethyl-3-cyclohexene-1-carboxyaldehyde, benzaldehyde, 2-chlorobenzaldehyde, p-dimethylaminobenzaldehyde, t-butylbenzaldehyde, 3,4-dimethoxybenzaldehyde, 2-nitrobenzaldehyde, 4-cyanobenzaldehyde, 4-carboxybenzaldehyde, 4-phenylbenzaldehyde, 4-fluorobenzaldehyde, 2-(trifluoromethyl)benzaldehyde, 1-naphthaldehyde, 2-naphthaldehyde, 6-methoxy-2-naphthaldehyde, 3-methyl-2-thiophenecarboxyaldehyde, 2-pyridinecarboxyaldehyde and indole-3-carboxyaldehyde.

Examples of the ketone compound include acetone, ethyl methyl ketone, diethyl ketone, t-butyl ketone, dipropyl ketone, allyl ethyl ketone, acetophenone, p-methylacetophenone, 4'-aminoacetophenone, p-chloroacetophenone, 4'-methoxyacetophenone, 2'-hydroxyacetophenone, 3'-nitroacetophenone, P-(1-piperidino) acetophenone, benzalacetophenone, propiophenone, benzophenone, 4-nitrobenzophenone, 2-methylbenzophenone, p-bromobenzophenone, cyclohexyl (phenyl)methanone, 2-butyronaphthone, and 1-acetonaphthone.

In the general formula (I), $R_3$ represents a hydrogen atom, a straight-chain or branched alkyl group having a carbon number of 1 to 4, a benzyl group, a silyl group, a phosphate group, an acyl group, a benzoyl group, or a sulfonyl group.

The $R_3$ is used to protect a remaining hydroxyl group (called "end cap treatment") to thereby adjust a water absorption rate to an appropriate value. For example, when the above polymer is used as a retardation film, the water absorption rate may be set to a small value to allow the retardation film to have high transparency and excellent retardation stability. Depending on use or purpose of the polymer in the present invention, the substituent may not be subject to the end cap treatment (that is, the $R_3$ may be maintained as a hydrogen atom). As the $R_3$, it is possible to use any suitable group (typically, a protective group) capable of, after obtaining a polymer having a hydroxyl group remaining therein, reacting with the hydroxyl group to form a substituent (that is, capable of the end cap treatment).

Examples of the protective group include benzyl group, 4-methoxyphenylmethyl group, methoxymethyl group, trimethylsilyl group, triethylsilyl group, t-butyldimethylsilyl group, acetyl group, benzoyl group, methanesulfonyl group, and bis-4-nitrophenyl phosphite. Preferably, the $R_3$ is trimethylsilyl group, triethylsilyl group or t-butyldimethylsilyl group. The use of these substituents makes it possible to obtain a retardation film having high transparency and excellent retardation stability even in high-temperature and high-humidity environments.

In regard to reaction conditions for the end cap treatment, a suitable condition may be appropriately employed, depending on a type of substituent for reaction with a hydroxyl group. For example, reaction such as alkylation, benzylation, sililation, phosphorylation or sulfonylation can be performed by stirring a polymer having a hydroxyl group remaining therein and a chloride of an intended substituent, in the presence of a catalyst, such as 4(N,N-dimethylamino) pyridine, at a temperature of 25° C. to 100° C. for 1 to 20 hours.

In the general formula (I), the basic unit; o can be introduced, for example, as an aldehyde compound, by using a substituted or un-substituted benzaldehyde. The use of this polymer makes it possible to obtain a retardation film having further excellent transparency.

In the general formula (I), $R_4$ represents a hydrogen atom, a halogen atom, a straight-chain or branched alkyl group having a carbon number of 1 to 4, a straight-chain or branched alkyl halide group having a carbon number of 1 to 4, a straight-chain or branched alkoxy group having a carbon number of 1 to 4, an alkoxycarbonyl group, an acyloxy group, an amino group, a nitro group, a cyano group, or a hydroxyl group. The $R_4$ is a substituent substituting ortho-position, meta-position or p-position of the benzene ring.

In the general formula (I), in regard to ratios of the basic units l, m, n and o, suitable values may be appropriately selected, depending on the purpose. The ratio of the basic unit; l is set preferably in the range of 1 mol % to 20 mol %, more preferably in the range of 5 mol % to 15 mol %. The ratio of the basic unit; m is set preferably in the range of 20 mol % to 60 mol %, more preferably in the range of 25 mol % to 55 mol %. The ratio of the basic unit; n is set preferably in the range of 10 mol % to 60 mol %, more preferably in the range of 15 mol % to 55 mol %. The ratio of the basic unit; o is preferably in the range of 1 mol % to 20 mol %, more preferably in the range of 5 mol % to 15 mol %.

Further, a ratio [l/(m+o)](mol/mol) of the basic unit l to a sum of the basic units m and o is set preferably in the range of 0.10 to 0.50, more preferably in the range of 0.12 to 0.40, particularly preferably in the range of 0.15 to 0.30. The setting of the ratios of the basic units; l, m, n and o in the above ranges allows, for example, a retardation film containing the above polymer to exhibit excellent properties satisfying all of transparency, retardation developability and reverse wavelength dispersion property.

A weight-average molecular weight of the above polymer is set preferably in the range of 1,000 to 1,000,000, more preferably in the range of 3,000 to 500,000, particularly preferably in the range of 5,000 to 300,000. The setting of the weight-average molecular weight in the above range makes it possible to obtain a retardation film excellent in mechanical strength. The weight-average molecular weight can be calculated by the gel permeation chromatography (GPC) method using polystyrene as a standard sample. As an analyzer, it is possible to use "HLC-8120GPC" produced by TOSOH Corporation (column: TSK gel Super HM-HiH4000/H3000/H2000, column size: 6.0 mm I.D.×150 mm each, eluant: tetrahydrofuran, flow rate: 0.6 ml/min, detector: RI, column temperature: 40° C. injection volume: 20 µL).

A glass transition temperature of the above polymer is set preferably in the range of 90° C. to 190° C., more preferably in the range of 100° C. to 170° C., particularly preferably in the range of 110° C. to 160° C. The setting of the glass transition temperature in the above range makes it possible to obtain a retardation film excellent in heat resistance. The glass transition temperature can be measured by the DSC method according to JIS K 7121 (1987).

The polymer film containing the above polymer may further contain any suitable additive. Examples of the additive include plasticizer, heat stabilizer, light stabilizer, lubricant, antioxidant, ultraviolet absorbing agent, flame retardant, antistatic agent, compatibilizing agent, cross-linking agent, and thickener. In regard to an amount of the additive to be used, a suitable value may be appropriately selected, depending on the purpose. The amount of the additive is set preferably in the range of greater than 0 to 10 (weight ratio), more preferably in the range of greater than 0 to 5 (weight ratio), with respect to 100 weight parts of the polymer.

In regard to a thickness of the polymer film, a suitable value may be appropriately set, depending on the purpose. The thickness is set preferably in the range of 10 μm to 300 μm, more preferably in the range of 20 μm to 200 μm, particularly preferably in the range of 30 μm to 150 μm. The setting of the thickness in the above range makes it possible to obtain a retardation film excellent in mechanical strength and thickness uniformity.

A retardation film according to another embodiment of the present invention is a stretched film of a polymer film consisting primarily of a polyvinyl acetal-based resin having a structure represented by the following general formula (II).

The polyvinyl acetal-based resin can be obtained through a condensation reaction (also referred to as "acetalization") using: a polyvinyl alcohol-based resin; and two or more types of aldehydes and two or more types of ketones, or at least one type of aldehyde and at least one type of ketone. A stretched film of the polymer film consisting primarily of a polyvinyl acetal-based resin having a structure represented by the following general formula (II) makes it possible to obtain a retardation film which exhibits a reverse wavelength dispersion property and has excellent formability/processability, stretchability and retardation stability (stability in retardation values). In addition, the retardation film is excellent in stretch-orientation property, so that a thickness of the retardation film can be thinned.

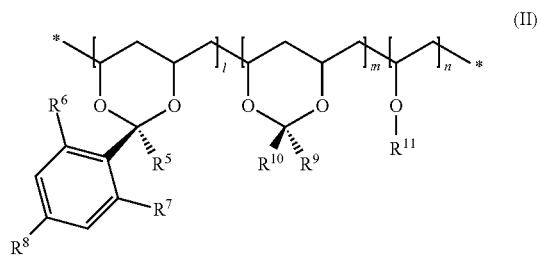

(II)

(In the general formula (II), $R_5$, $R_9$ and $R_{10}$ each independently represent a hydrogen atom, a straight-chain, branched-chain or cyclic alkyl group having a carbon number of 1 to 8, a phenyl group which may have a substituent, a naphthyl group which may have a substituent, an anthranyl group which may have a substituent, or a phenanthrenyl group which may have a substituent. $R_6$, $R_7$ and $R_8$ each independently represent a hydrogen atom, a straight-chain, branched-chain or cyclic alkyl group having a carbon number of 1 to 4, a straight-chain or branched-chain alkoxy group having a carbon number of 1 to 4, a halogen atom, an alkyl halide group, a nitro group, an amino group, a hydroxyl group, a cyano group, or a thiol group, wherein the $R_6$ and $R_7$ are not simultaneously hydrogen atoms. $R_{11}$ represents a hydrogen atom, a straight-chain, branched-chain or cyclic alkyl group having a carbon number of 1 to 8, a benzyl group, a silyl group, a phosphoric group, an acyl group, a benzoyl group, or a sulfonyl group. Each of l, m and n represents an integer of 1 or more.)

In the general formula (II), substituents for the $R_9$ and $R_{10}$ are used to more finely control a wavelength dispersion property of a retardation film obtainable by stretching the polymer film consisting primarily of a polyacetal-based resin having a structure represented by the general formula (II). More specifically, the introduction of substituents to the $R_9$ and $R_{10}$ allows the substituents to be oriented in a direction approximately parallel to a stretching direction when the polymer film is subjected to stretching. It is believed that the wavelength dispersion property of the retardation film of the present invention can be obtained by interaction of the wavelength dispersion property of the benzene ring oriented approximately perpendicularly to the virtual line connecting the two oxygen atoms, the wavelength dispersion property of the main chain structure, and a wavelength dispersion property of the substituents introduced to the $R_9$ and $R_{10}$ described here. Further, the formability/processability, stretchability, retardation stability and stretch-orientation property of the polymer film can be further improved.

Each of the $R_9$ and $R_{10}$ may be appropriately selected, for example, according to a type of aldehyde (typically, benzaldehydes) or ketone (typically, acetophenones or benzophenons) to be subjected to reaction with alcohol when the polyvinyl acetal-based resin is obtained. Specific examples of aldehyde and ketone are as described above.

The $R_9$ is preferably a hydrogen atom or a methyl group, most preferably a hydrogen atom. The $R_{10}$ is preferably a methyl group or an ethyl group, most preferably an ethyl group. The introduction of the above substituents makes it possible to obtain a retardation film having significantly excellent formability/processability, stretchability, retardation stability, and stretch-orientation property.

In the general formula (II), a substituent for the $R_{11}$ is used to protect a remaining hydroxyl group (end cap treatment) to thereby adjust the water absorption rate to an appropriate value and enhance solubility of resins with respect to a solvent, formability/processability, and retardation stability. Thus, depending on a water absorption rate or optical properties of an obtained retardation film, or intended use of the retardation film of the present invention, the $R_{11}$ may not be subjected to the end cap treatment, and maintained as a hydrogen atom.

The $R_{11}$ can be obtained by obtaining a polyvinyl acetal-based resin having a hydroxyl group remaining therein, and then subjecting the polyvinyl acetal-based resin to the end cap treatment using, for example, a heretofore-known group (typically, a protective group) capable of reacting with a hydroxyl group to form a substituent. Specific examples of the protective group include a benzyl group, a 4-methoxyphenylmethyl group, a methoxymethyl group, a trimethylsilyl group, a triethylsilyl group, a t-butyldimethylsilyl group; an acetyl group; a benzoyl group; a methanesulfonyl group; and bis-4-nitrophenylphosphite. In regard to reaction conditions for the end cap treatment, suitable conditions may be appropriately employed, depending on a type of substituent for reacting with a hydroxyl group. For example, a reaction such as alkylation, benzylation, silylation, phosphorylation, or sulfonylation may be performed by stilling a polyvinyl acetal-based resin having a hydroxyl group remaining therein and a chloride of an intended substituent, in the presence of a catalyst such as 4-(N,N-dimethylamino) pyridine at a temperature of 25° C. to 100° C. for 1 hour to 20 hours. Preferably, the $R_{11}$ is one type of silyl group selected from a trimethylsilyl group, a triethylsilyl group, and a t-butylmethylsilyl group. The use of these substituents makes it possible to obtain a retardation film capable of exhibiting excellent retardation stability and maintaining high transparency even in environments such as high-temperature and high-humidity environments.

In the general formula (II), in regard to ratios of l, m and n, suitable values may be appropriately selected, depending on a type of substituent and a purpose thereof. Preferably, the l, m and n are, respectively, set preferably in the range of 5 to 30 (mol %), in the range of 20 to 80 (mol %) and in the range of 1 to 70 (mol %), particularly preferably in the range of 10 to 28 (mol %), in the range of 30 to 75 (mol %), and in the range of 1 to 50 (mol %), most preferably, in the range of 15 to 25 (mol %), in the range of 40 to 70 (mol %) and in the range of 10 to 40 (mol %), with respect to 100 (mol %) of a total of the l, m and n. The setting of the ratios of the l, m and n in the above ranges makes it possible to obtain a retardation film exhibiting a reverse wavelength dispersion property and having significantly excellent formability/processability, stretchability, retardation stability, and stretch-orientation property.

<5. Polymer Film Production Method>

A polymer film containing the above polymer can be obtained by any suitable forming/processing process. Examples of the forming/processing process include a compression molding process, a transfer molding process, an injection molding process, an extrusion molding process, a blow molding process, a powder molding process, a FRP molding process, and a solvent casting process. Preferably, the forming/processing process is the solvent casting process or the extrusion molding process. Specifically, the solvent casting process comprises, for example: defoaming a concentrated solution (dope) in which a composition comprising a polymer as a main component and an additive is dissolved in a solvent; casting the solution in the form of a sheet on a surface of an endless stainless belt or a rotary drum to form a film by vaporizing the solvent. The extrusion molding process comprises, for example: heating and melting a composition comprising a polymer as a main component and an additive; extruding the molten composition in the form of a sheet on a surface of a casting roll using a T-die or the like to form a film by cooling. The use of the above process becomes possible to obtain a polymer film excellent in thickness uniformity.

<6. Polarizing Plate>

Figure 2:
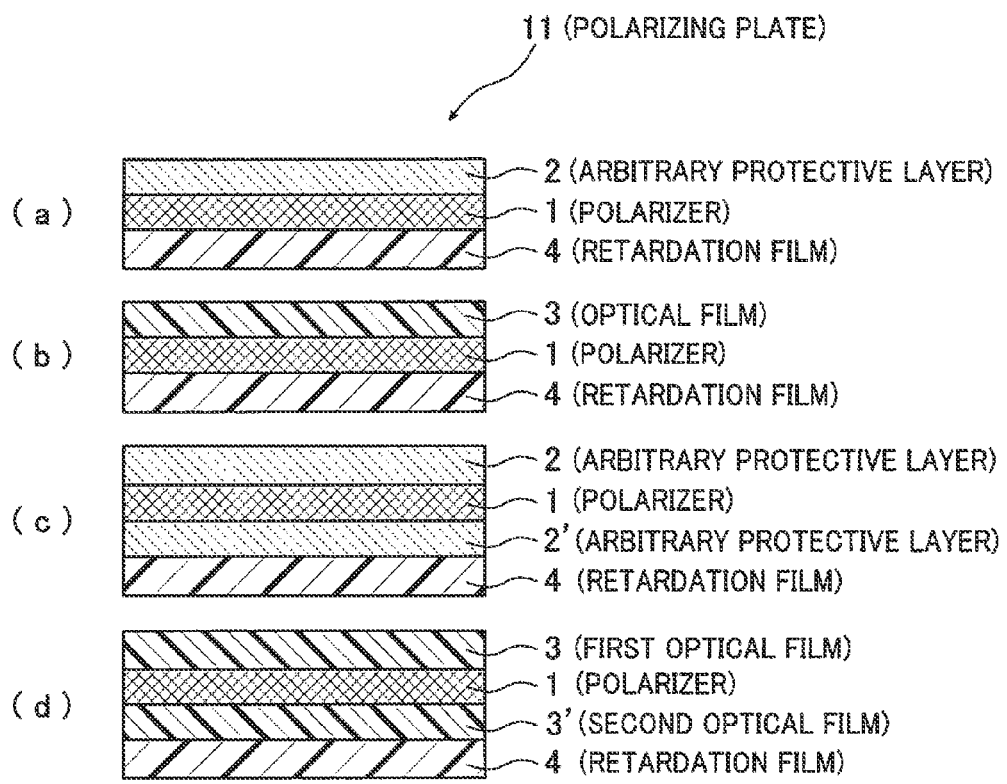
FIG. 2 is a schematic sectional view of a polarizing plate using a retardation film, in a preferred embodiment of the present invention.

A polarizing plate according to one embodiment of the present invention comprises the above retardation film and a polarizer. FIG. 2 is a schematic sectional view of a polarizing plate using a retardation film, according to a preferred embodiment of the present invention. A polarizing plate illustrated in FIG. 2(a) comprises a polarizer 1, an arbitrary protective layer 2 provided on one side of the polarizer 1, and a retardation film 4 provided on the other side. A polarizing plate illustrated in FIG. 2(b) comprises a polarizer 1, an optical film 3 provided on one side of the polarizer 1, and a retardation film 4 provided on the other side. A polarizing plate illustrated in FIG. 2(c) comprises a polarizer 1, an arbitrary protective layer 2 provided on one side of the polarizer i, an arbitrary protective layer 2' provided on the other side, and a retardation film 4 provided on the protective layer 2' on a side opposite to the polarizer 1. A polarizing plate illustrated in FIG. 2(d) comprises a polarizer i, two optical films 3, 3' provided, respectively, on opposite sides of the polarizer 1, and a retardation film 4 provided on the optical film 3' on a side opposite to the polarizer 1.

The arbitrary protective layers 2, 2' may be identical to each other or may be different from each other. The optical films 3, 3' may be identical to each other or may be different from each other.

In one example of the polarizing plate of the present invention, an absorption axis direction of the polarizer is substantially parallel to or substantially perpendicular to a slow axis direction of the retardation film. As used in this specification, the term "substantially parallel" encompasses a situation where an angle defined between the absorption axis direction of the polarizer and the slow axis direction of the retardation film falls within 0 degree±2.0 degrees. The term "substantially perpendicular" encompasses a situation where the angle defined between the absorption axis direction of the polarizer and the slow axis direction of the retardation film falls within 90 degrees±2.0 degrees. In this example, it becomes possible to eliminate an influence of birefringence of the retardation film on display properties of a liquid crystal display, in a normal viewing direction, while allowing a liquid crystal cell to be optically compensated by the birefringence of the retardation film, in oblique viewing directions. This makes it possible to obtain a liquid crystal display having a high contrast ratio in not only the normal viewing direction but also the oblique viewing directions.

In one example of the polarizing plate of the present invention, the angle defined between the absorption axis direction of the polarizer and the slow axis direction of the retardation film is substantially 45 degrees. As used in this specification, the term "substantially 45 degrees" encompasses a situation where the angle defined between the absorption axis direction of the polarizer and the slow axis direction of the retardation film falls within 45 degrees±3.0 degrees, preferably 45 degrees±2.0 degree. In this example, it becomes possible to obtain an excellent circularly polarizing plate capable of converting linearly polarized light into circularly polarized light (or converting circularly polarized light into linearly polarized light) in a wide range of visible light.

Practically, an adhesive layer or a pressure-sensitive adhesive layer (not illustrated) is provided between the polarizer and each member (arbitrary protective layer, optical film, retardation film) adjacent thereto to allow the polarizer and each member to be laminated to each other. In this manner, the retardation film of the present invention is disposed on at least one side of the polarizer. This makes it possible to obtain a display excellent in display uniformity, for example.

As the polarizer, any suitable type may be appropriately employed, as long as it is capable of converting natural light or polarized light to linearly polarized light. Preferably, the polarizer is a stretched film consisting primarily of a polyvinyl alcohol-based resin containing iodine or dichroic dye. As used in this specification, the term "stretched film" means a polymer film obtained by applying tension to an un-stretched film at an appropriate temperature to thereby enhance molecular orientation in a tensile direction.

As the dichroic dye, any suitable type may be appropriately employed. As used in this specification, the term "dichroic" means an optical anisotropy in which absorbance of light varies in two directions: an optic axis direction, and a direction perpendicular thereto.

As the polymer film for use in the present invention, which consists primarily of a polyvinyl alcohol-based resin, it is possible to use a commercially available film without modification. Examples of the commercially available polymer film consisting primarily of a polyvinyl alcohol-based resin include "Kuraray Vinylon Film" (trade name; produced by Kuraray Co., Ltd.), "Tohcello Vinylon Film" (trade name; produced by Tohcello Co., Ltd.), and "Nichigo Vinylon Film" (trade name; produced by Nippon Synthetic Chemical Industry Co., Ltd.).

Figure 3:
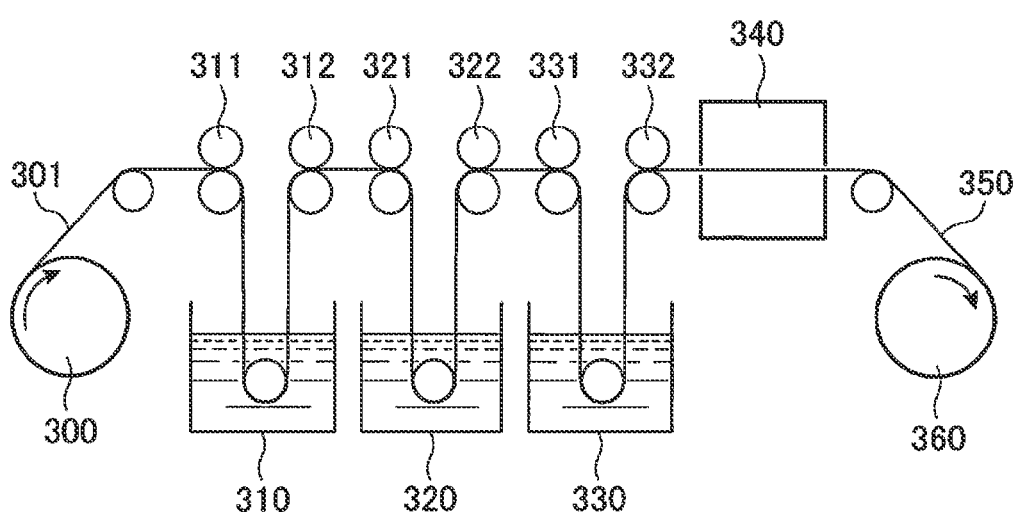
FIG. 3 is a schematic diagram illustrating a concept of a polarizer production process in one embodiment of the present invention.

With reference to FIG. 3, an example of a production method for a polarizer will be described. FIG. 3 is a schematic diagram illustrating a concept of a production process of a polarizer in one example of the present invention. For example, a polymer film 301 consisting primarily of a polyvinyl alcohol-based resin is fed from a feeding section 300, and after being immersed in an aqueous iodine solution bath 310, subjected to a swelling and dyeing step, while being applied with tension in a longitudinal direction of the film by rolls 311, 312 driven at different rotation speed ratios. Then, the film is immersed in a bath 320 of an aqueous solution containing boric acid and potassium iodide, and subjected to a cross-linking treatment, while being applied with tension in the longitudinal direction of the film by rolls 321, 322 driven at different rotation speed ratios. The film subjected to the cross-linking treatment is immersed in a bath 330 of an aqueous solution containing potassium iodide, and subjected to a water washing treatment, according to rolls 331 and 332. The film subjected to the water washing treatment is dried by drying means 340 to adjust a water content, for example, to fall within the range of 10% to 30%, and taken up by a take-up section 360. A polarizer 350 can be obtained by stretching the polymer film consisting primarily of a polyvinyl alcohol-based resin, 5 times to 7 times with respect to its original length, through the above process.

As the arbitrary protective layer, any suitable type may be appropriately employed. The protective layer is used to prevent a polarizer from shrinking and expanding, and/or prevent degradation of the polarizer due to ultraviolet light. Specific examples of a material usable as a primary component of such a film include: a cellulose-based resin such as triacetylcellulose (TAC); and a transparent resin such as a polyester-based, polyvinyl alcohol-based, polycarbonate-based, polyamide-based, polyimide-based, polyether sulfone-based, polysulfone-based, polystyrene-based, polynorborene-based, polyolefin-based, acrylic-based, or acetate-based resin. The specific examples also include thermosetting resin or UV-curable resin such as an acrylic-based, urethane-based, acrylic urethane-based, epoxy-based, or silicone-based resin. The specific examples further include a glassy polymer such as a siloxane-based polymer. When a plurality of protective layers are used, they may be identical to each other or may be different from each other.

Preferably, the protective layer is transparent and colorless. Specifically, the retardation in the thickness direction is set preferably in the range of −90 nm to +90 nm, more preferably in the range of −80 nm to +80 nm, most preferably in the range of −70 nm to +70 nm.

In regard to a thickness of the protective layer, any suitable value may be employed as long as the desired thickness-directional retardation can be obtained. Specifically, the thickness of the protective layer is set preferably to 100 μm or less, more preferably to 80 μm or less, particularly preferably to 40 μm or less.

Referring to FIG. 2, an arbitrary surface-treated layer may be formed on a surface of each of the arbitrary protective layers 2, 2' and the optical films 3, 3'. As the surface-treated layer, it is possible to employ various types obtained through a hard coat treatment, an antistatic treatment, a reflection preventing treatment (also referred to as "anti-reflection treatment"), a diffusion treatment (also referred to as "anti-glare treatment"), and others. These surface-treated layers are used for the purpose of preventing staining or scratching of a screen or preventing difficulty in viewing display images due to glare of room fluorescent light or sunlight on a screen. The surface-treated layer is generally obtained by fixing, on a surface of a base film, a treatment agent for forming the treated layer. The base film may additionally serve as the protective layer or the optical film. The surface-treated layer may have a multilayer structure such as a laminate having a hard-coat treatment layer on an antistatic treatment layer. As the surface-treated layer, a commercially available surface-treated layer may be used without modification. Examples of the commercially-available, hard coat-treated and antistatic-treated film include "KC8UX-HA" (trade name; produced by Konica Minolta Opto, Inc.). Examples of the commercially-available, antireflection-treated layer include ReaLook series produced by Nippon Oil & Fats Co., Ltd.

<7. Display Panel Device>

A display panel device according to one embodiment of the present invention comprises the above polarizing plate, and a display panel, such as a liquid crystal display panel or an organic EL display panel. The polarizing plate and the display panel may be directly adhesively bonded together, or may be arranged through an arbitrary member such as a touch panel or other optical member.

EXAMPLES

The present invention will be more specifically described based on the following Examples. It is to be understood that the present invention is not limited to the following Examples. Analysis methods used in Examples are as follows.

(1) Measurement of Composition Ratio

A composition ratio was measured using a nuclear magnetic resonance spectrometer "LA 400" [trade name; produced by JEOL Ltd.] (Measurement solvent; deuterated DMSO, frequency; 400 MHz, observation nucleus; $^1$H, measured temperature; 70° C.).

(2) Measurement Method for Thickness

A thickness of less than 10 μm was measured using a thin film spectrophotometer "Instantaneous Multichannel Photodetector system MCPD-2000)" (trade name; produced by Otsuka Electronics Co., Ltd.). A thickness of 10 μm or more was measured using a digital micrometer "KC-351C-type" (trade name; produced by Anritsu Corporation).

(3) Measurement Method for Refractive Index of Film

A refractive index was measured under light of a wavelength of 450 nm and light of a wavelength of 550 nm, at 23° C., using an Abbe refractometer "DR-M4" (trade name; produced by Atago Co., Ltd.)

(4) Measurement Method for Retardation Values (Re, Rth)

Retardation values were measured using "AxoScan" (trade name; produced by Axometrics Inc.) in a room at 23° C.

(5) Measurement Method for Transmittance

A transmittance was measured under light of a wavelength of 550 nm at 23° C., using a spectrophotometer "DOT-3" (trade name; produced by Murakami Color Research Laboratory).

(6) Measurement of Glass Transition Temperature

A glass transition temperature was measured using a differential scanning calorimeter "DSC-6200" (trade name; produced by Seiko Instruments, Inc.), according to JIS K 7121 (1987) (Measurement method for transition temperature of plastics). Specifically, under a condition that 5 mg of film sample was heated (at a heating rate of 10° C./min) under a nitrogen atmosphere (gas flow rate: 80 mL/min), the measurement was performed two times, and data obtained in the second measurement was used.

(7) Shrinkage Rate

A shrinkage rate was defined by the following formula: [(maximum inter-chuck distance after stretching−inter-tenter chuck distance after shrinkage)/(maximum inter-chuck distance after stretching)]×100.

(8) Orientation Angle

An orientation angle was measured by the same method as that for the measurement for retardation values.

The orientation angle was measured at at least three points along an in-plane direction to determine a maximum value and a minimum value therefrom.

The orientation angle is an angle defined between a reference direction of the measurement device and a slow axis direction of the retardation film.

(9) Wavelength Dispersion

A wavelength dispersion value was measured by the same method as that for the measurement for retardation values.

A retardation value at a wavelength of 450 nm and a retardation value at a wavelength of 550 nm were measured using "AxoScan" (trade name; produced by Axometrics Inc.), and a retardation value R (450) measured at a wavelength of 450 nm was divided by a retardation value R (550) measured at a wavelength of 550 nm, to obtain a wavelength dispersion value.

(10) Wavelength Dispersion Change

A sample used in the measurement of the wavelength dispersion value was laminated to a glass plate using a pressure-sensitive adhesive, and put in a constant-temperature bath at 90° C. for 100 hours. After an elapse of 100 hours, the sample was re-subjected to the above measurement to obtain a wavelength dispersion value, and an amount of change with respect to the wavelength dispersion value measured before being heated to 90° C. was calculated.

(11) Evaluation on Unevenness (11-1) [Preparation of Display Panel Device]

Each of a plurality types of retardation films obtained in Inventive and Comparative Examples and a polarizing plate "NPF TEG1465DUHC" (trade name: produced by Nitto Denko Corporation) (layer thickness except any pressure-sensitive adhesive layer: 112 μm) were laminated through an acrylic-based pressure-sensitive adhesive layer (20 μm) in such a manner as to allow an angle defined between a slow axis of the retardation film and an absorption axis of the polarizing plate to become 45 degrees, thereby preparing a circularly polarizing plate. This circularly polarizing plate was laminated onto a viewing side of an organic EL panel "15EL9500" (trade name; produced by LG Display Co., Ltd.) through the above acrylic-based pressure-sensitive adhesive layer (20 μm) to prepare a display panel device.

(11-2) [Heating Test of Display Panel Device]

Before a heating test, chromaticities (reflection hues) at 45 points on a display screen of the display panel device were measured using a spectrophotometric colorimeter "CM-2600d" (trade name: produced by Konica Minolta Sensing, Inc.). The measurement points were set, respectively, in central ones of 45 areas defined by dividing the display screen equally vertically and horizontally into 5×9 pieces. Further, uniformity of reflected color on the entire display screen was visually evaluated. Then, after storing the display panel device in a constant-temperature oven at 90° C. for 100 hours (heating test), chromaticities at the 45 points on the display screen were measured in the same manner. Furthermore, uniformity of reflection color on the entire display screen was visually evaluated.

Inventive Example 1

8.8 g of polyvinyl alcohol-based resin "NH-18" [trade name; produced by Nippon Synthetic Chemical Industry Co., Ltd. (polymerization degree=1800, saponification degree=99.0%)] was dried at 105° C. for 2 hours and then dissolved in 167.2 g of dimethyl sulfoxide (DMSO). 2.98 g of 2-methoxy-1-naphthaldehyde and 0.80 g of p-toluenesulfonate monohydrate were added thereto, and stirred at 40° C. for 1 hour. 3.18 g of benzaldehyde was added to the reaction solution, and stirred at 40° C. for 1 hour. Then, 4.57 g of dimethylacetal was further added thereto, and stirred at 40° C. for 3 hours. Then, 2.13 g of triethylamine was added thereto to finish the reaction. The obtained crude product was subject to reprecipitation by 1 L methanol. A filtered polymer was dissolved in tetrahydrofuran and re-subject to reprecipitation by methanol. A resulting product was filtered and dried to obtain 11.9 g of a white polymer. This polymer was measured by $^1$H-NMR. As a result, it had a repeating unit represented by the following formula (III), and a ratio (mole ratio) of l:m:n:o was 10:25:52:11. Further, the polymer had a glass transition temperature (Tg) of 130° C.

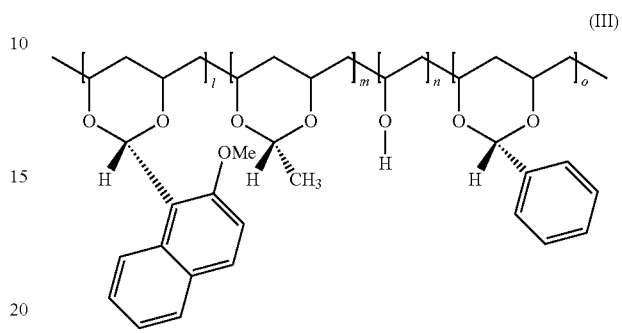

(III)

(Film Formation Step)

The above polymer was dissolved in methyl ethyl ketone (MEK), and applied onto a polyethylene terephthalate film (thickness: 70 μm) using an applicator. Then, after drying the applied layer in an air circulation type drying oven at 130° C., the dried layer was peeled from the polyethylene terephthalate film to prepare a film having a thickness of 135 μm.

(Stretching Step)

This film was subjected to transverse uniaxial stretching at a stretching rate of 2.1 times, using a stretching machine in an air circulation type drying oven at 130° C. to prepare a stretched film.

(Shrinkage Step)

The stretched film was subjected to shrinkage, firstly in an air circulation type drying oven at 131° C. (first shrinkage step), secondly in an air circulation type drying oven at 126° C. (second shrinkage step), and thirdly in an air circulation type drying oven at 121° C. (third shrinkage step). The shrinkage rate was 3%.

Inventive Example 2

Except that the shrinkage rate was set to 5%, a retardation film was prepared in the same manner as that in Inventive Example 1.

Inventive Example 3

Except that the third shrinkage step was omitted, a retardation film was prepared in the same manner as that in Inventive Example 1. The shrinkage rate was 5%.

Inventive Example 4

8.8 g of polyvinyl alcohol-based resin "NH-18" (trade name; produced by Nippon Synthetic Chemical Industry Co., Ltd. (polymerization degree=1800, saponification degree=99.0%)) was dried at 105° C. for 2 hours and then dissolved in 167.2 g of dimethyl sulfoxide (DMSO). 2.98 g of 2-methoxy-1-naphthaldehyde and 0.80 g of p-toluenesulfonate monohydrate were added thereto, and stirred at 40° C. for 1 hour. 3.18 g of benzaldehyde was added to the reaction solution, and stirred at 40° C. for 1 hour. Then, 10.4 g of 2,2-dimethoxypropane was further added thereto, and stirred at 40° C. for 3 hours. Then, 2.13 g of triethylamine was added thereto to finish the reaction. The obtained crude product was subject to reprecipitation by 1 L methanol. A filtered polymer was dissolved in tetrahydrofuran and re-subject to reprecipitation by methanol. A resulting product was filtered and dried to obtain 18.8 g of a white polymer. This polymer was measured by $^1$H-NMR. As a result, it had a repeating unit represented by the following formula (V), and a ratio (mole ratio) of l:m:n:o was 13:31:43:13. Further, the polymer had a glass transition temperature (Tg) of 133° C.

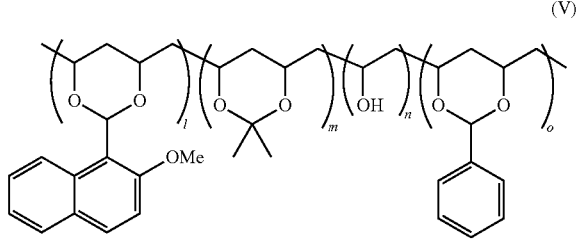

(V)

(Film Formation Step)

The above polymer was dissolved in methyl ethyl ketone (MEK), and applied onto a polyethylene terephthalate film (thickness: 70 μm) using an applicator. Then, after drying the applied layer in an air circulation type drying oven at 130° C., the dried layer was peeled from the polyethylene terephthalate film to prepare a film having a thickness of 170 μm.

(Stretching Step)

This film was subjected to transverse uniaxial stretching at a stretching rate of 2.1 times, using a stretching machine in an air circulation type drying oven at 130° C. to prepare a stretched film.

(Shrinkage Step)

The stretched film underwent shrinkage through the first shrinkage step, the second shrinkage step and the third shrinkage step, in the same manner as that in Inventive Example 1. The shrinkage rate was 5%.

Inventive Example 5

11.7 g of white polymer was obtained in the same manner as that in Inventive Example 1, except that 8.81 g of acetaldehyde was added, instead of dimethylacetal, and the amount of 2-methoxy-1-naphthaldehyde was set to 2.89 g. As a result of the measurement by $^1$H-NMR, the polymer had a repeating unit represented by the following formula (IV), and a ratio (molar ratio) of l:m:n:o was 11:54:28:7. Further, the polymer had a glass transition temperature (Tg) of 126° C.

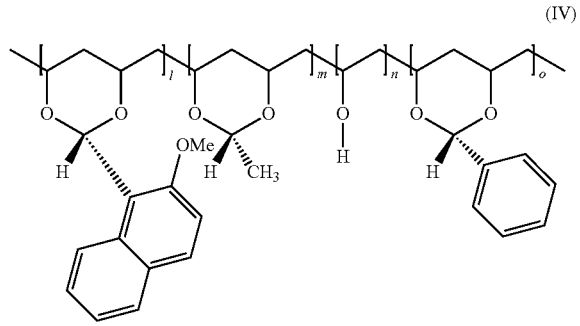

(IV)

(Film Formation Step)

The above polymer was dissolved in methyl ethyl ketone (MEK), and applied onto a polyethylene terephthalate film (thickness: 70 μm) using an applicator. Then, after drying the applied layer in an air circulation type drying oven, the dried layer was peeled from the polyethylene terephthalate film to prepare a film having a thickness of 95 μm.

(Stretching Step)

This film was subjected to transverse uniaxial stretching at a stretching rate of 2.5 times, using a stretching machine in an air circulation type drying oven at 130° C. to prepare a stretched film.

(Shrinkage Step)

The stretched film underwent shrinkage through the first shrinkage step, the second shrinkage step and the third shrinkage step, in the same manner as that in Inventive Example 1. The shrinkage rate was 5%.

Inventive Example 6

67.35 parts of cyclohexanedimethanol (CHDM), 90.94 parts of 9,9-bis(4-hydroxy-3-methylphenyl)florene (BCF) and 154.61 parts of diphenylcarbonate, and $1.8 \times 10^{-2}$ parts of tetramethylammonium hydroxide and $1.6 \times 10^{-4}$ parts of sodium hydroxide each serving as catalyst were heated in a nitrogen atmosphere at 180° C. and melted. Then, the degree of reduced pressure was adjusted to 13.4 kPa by taking 30 minutes. Then, the temperature was increased up to 260° C. at a heating rate of 60° C./hour, and this temperature was maintained for 10 minutes. Then, the degree of reduced pressure was adjusted to 133 Pa or lower by taking 1 hour. The reaction was carried out under stirring for a total time period of 6 hours.

After completion of the reaction, dodecylbenzenesulfonic acid tetrabutylphosphonium salt was added in an amount 4 times the catalyst amount to deactivate the catalysts, then, a reaction product was discharged from a bottom of the reaction vessel under nitrogen pressure and cut with a pelletizer while cooling it in a water vessel to obtain pellets (copolycarbonate). The copolymer had a glass transition temperature (Tg) of 116° C.

(Film Formation Step)

Subsequently, a T-die having a width of 150 mm and a lip width of 500 μm and a film take-up device were attached to a 15 mm φ biaxial extruder (produced by Technovel Co., Ltd.) to subject the obtained copolycarbonate to film-forming, thereby obtaining a transparent extruded film having a thickness of 120 μm.

(Stretching Step)

This film was subjected to transverse uniaxial stretching at a stretching rate of 2.1 times, using a stretching machine in an air circulation type drying oven at 126° C. to prepare a stretched film.

(Shrinkage Step)

The stretched film was subjected to shrinkage, firstly in an air circulation type drying oven at 116° C. (first shrinkage step), secondly in an air circulation type drying oven at 111° C. (second shrinkage step), and thirdly in an air circulation type drying oven at 106° C. (third shrinkage step). The shrinkage rate was 5%.

Inventive Example 7

(A)

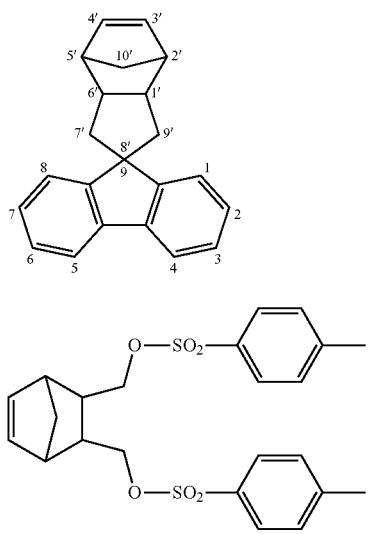

(B)

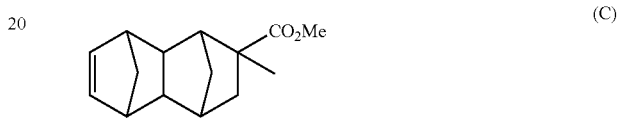

15.52 g (0.0934 mol) of fluorene was weighted and put in a 1000 mL flask equipped with a drip funnel, and air in a reaction system was replaced with nitrogen. 165 mL of dewatered THF was added thereto, and dissolved therein under sufficient stirring using a stirrer. Then, 117 mL of 1.6 mol/L hexane solution of n-butyllithium was gradually dripped, under a condition that the reaction system was placed in a dry ice bath to maintain a temperature thereof at −78° C. After completion of the dripping, the stirring of the reaction solution was continued for 1 hour, under the condition that the temperature of the reaction system is maintained at −78° C. A mixture obtained by preliminarily dissolving 21.60 g of 2endo, 3endo-bis-(toluene-4-sulfonyloxy)-5-norbornene ((B), endo) in 500 mL of dewatered THF was gradually dripped under the condition that the temperature of the reaction system is maintained at −78° C. After completion of the dripping, the stirring was continued for 1 hour within the dry ice bath. Then, the cooling bath was removed, and the stirring was continued (for about 3 hours) until the temperature of the reaction system definitely returned to room temperature. A Salt solution was added thereto to quench the reaction solution. Then, the reaction solution was washed with distilled water three times, and dried using sodium sulfate. Subsequently, a resulting dried reaction product was subjected to depressurization and heating to remove a solvent therefrom, and an obtained crystal was re-crystallized using methanol to obtain 5.68 g of spiro[fluorene-9,8'-tricyclo[4.3.0.1 2,5][3]decene](endo form), as a faint yellow crystal.

As a norbornene-based monomer, 1.90 g of spiro[fluorene-9,8'-tricyclo[4.3.0.1 2,5][3]decene](endo form) represented by the structural formula (A), 6.2 g of 8-methoxycarbonyl-8-methyltetracyclo[4.4.0.1 2,5.1 7,10]-3-dodecene, represented by the structural formula (C), 0.419 g of 1-hexene as a molecular-weight regulating agent, and 18.6 g of toluene, were set in a nitrogen-replaced reaction vessel, and heated up to 80° C. 0.267 mL of toluene solution of triethylaluminum (0.6 mol/L) and 0.066 mL of toluene solution (0.025 mol/L) of methanol-modified WC16 were added thereto to induce a reaction at 80° C. for 3 hours, thereby obtaining a ring-opened copolymer solution. The obtained ring-opened copolymer had a weight-average molecular weight (Mw) of $11.4 \times 10^4$, and a molecular weight distribution (Mw/Mn) of 4.60.

Subsequently, the obtained ring-opened copolymer solution was placed in an autoclave, and 83.8 g of toluene was added thereto. RuHCl (CO) [P($C_6H_5$)]$_3$ as a hydrogeneration catalyst was added in an amount of 2500 ppm with respect to a total amount of the monomers to induce a reaction under a hydrogen gas pressure set at 9 to 10 MPa, at 160 to 165° C. for 3 hours. After completion of the reaction, a reaction product was precipitated in a large amount of methanol solution to obtain a hydrogenated substance. The obtained hydrogenated substance (resin (P1)) of the ring-opened copolymer has: a weight-average molecular weight (Mw) of $10.6 \times 10^4$; a molecular weight distribution (Mw/Mn) of 3.52; an intrinsic viscosity [η] of 0.7; and a glass transition temperature (Tg) of 184.0° C.

(C)

[structure with $CO_2Me$]

(Film Formation Step)

The above polymer was dissolved in methylene chloride, and applied onto a polyethylene terephthalate film (thickness: 70 μm) using an applicator. Then, after drying the applied layer in an air circulation type drying oven at 80° C., the dried layer was peeled from the polyethylene terephthalate film to prepare a film having a thickness of 155 μm.

(Stretching Step)

This film was subjected to transverse uniaxial stretching at a stretching rate of 2.0 times, using a stretching machine in an air circulation type drying oven at 190° C. to prepare a stretched film.

(Shrinkage Step)

The stretched film was subjected to shrinkage, firstly in an air circulation type drying oven at 184° C. (first shrinkage step), secondly in an air circulation type drying oven at 174° C. (second shrinkage step), and thirdly in an air circulation type drying oven at 164° C. (third shrinkage step). The shrinkage rate was 5%.

Comparative Example 1

8.8 g of polyvinyl alcohol-based resin "NH-18" (trade name: produced by Nippon Synthetic Chemical Industry Co., Ltd. (polymerization degree=1800, saponification degree=99.0%)) was dried at 105° C. for 2 hours and then dissolved in 167.2 g of dimethyl sulfoxide (DMSO). 2.98 g of 2-methoxy-1-naphthaldehyde and 0.80 g of p-toluenesulfonate monohydrate were added thereto, and stirred at 40° C. for 1 hour. 3.18 g of benzaldehyde was added to the reaction solution, and stirred at 40° C. for 1 hour. Then, 4.57 g of dimethylacetal was further added thereto, and stirred at 40° C. for 3 hours. Then, 2.13 g of triethylamine was added thereto to finish the reaction. The obtained crude product was subject to reprecipitation by 1 L methanol. A filtered polymer was dissolved in tetrahydrofuran and re-subject to reprecipitation by methanol. A resulting product was filtered and dried to obtain 11.9 g of a white polymer. This polymer was measured by $^1$H-NMR. As a result, it had a repeating unit represented by the following formula (XI), and a ratio (mole ratio) of l:m:n:o was 10:25:52:11. Further, a glass transition temperature (Tg) of this polymer was measured by a differential scanning calorimeter. As a result, the glass transition temperature (Tg) was 130° C.

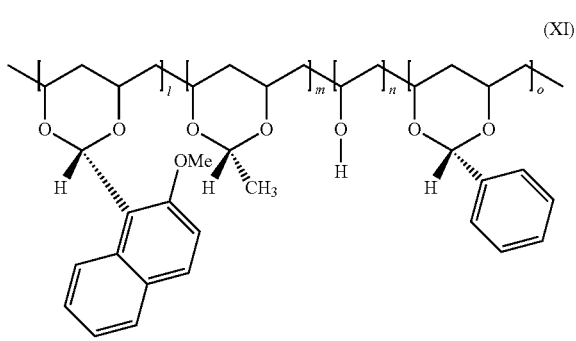

(XI)

(Film Formation Step)

The above polymer was dissolved in methyl ethyl ketone (MEK), and applied onto a polyethylene terephthalate film (thickness: 70 μm) using an applicator. Then, after drying the applied layer in an air circulation type drying oven, the dried layer was peeled from the polyethylene terephthalate film to prepare a film having a thickness of 135 μm.

(Stretching Step)

This film was subjected to transverse uniaxial stretching at a stretching rate of 2.1 times, using a stretching machine in an air circulation type drying oven at 135° C.

(Shrinkage Step)

No shrinkage step was performed.

Comparative Example 2

Except that, as a shrinkage step, the stretched film was subjected to shrinkage in an air circulation type drying oven at 135° C. (only the first shrinkage step was performed), a retardation film was prepared in the same manner as that in Comparative Example 1. The shrinkage rate of the film was 1%.

Comparative Example 3

5.0 g of polyvinyl alcohol-based resin "NH-18" (trade name: produced by Nippon Synthetic Chemical Industry Co., Ltd. (polymerization degree=1800, saponification degree=99.0%)) was dried at 105° C. for 2 hours and then dissolved in 95 mL of dimethyl sulfoxide (DMSO). 2.02 g of 2,4,6-trimethylbenzaldehyde (mesitylaldehyde) and 0.44 g of p-toluenesulfonate monohydrate were added thereto, and stirred at 40° C. for 2 hour. 13.41 g of 1,1-diethoxyethane (acetal) was added to the reaction solution, and further stirred at 40° C. for 2 hour. Then, 1.18 g of triethylamine was added thereto to finish the reaction. The obtained reaction product (polymer) was dripped into a methanol solution to cause reprecipitation. This polymer was precipitated and a supernatant solution was removed by decantation. Then, methanol/water=1/1 (volume/volume) was added to wash the polymer. The polymer was subjected to filtering, and a resulting polymer was dried to obtain 7.50 g of white polymer. The white polymer was measured by $^1$H-NMR. As a result, the polymer was a polyvinyl acetal-based resin having a structure (l:m:n=21:58:21) represented by the following formula (VI). Further, a glass transition temperature (Tg) of this polymer was measured by a differential scanning calorimeter. As a result, the glass transition temperature (Tg) was 120° C.

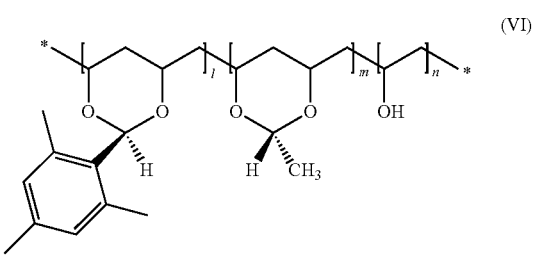

(VI)

(Film Formation Step)

The above polymer was dissolved in toluene, and applied onto a polyethylene terephthalate film (thickness: 70 μm) using an applicator. Then, after drying the applied layer in an air circulation type drying oven at 130° C., the dried layer was peeled from the polyethylene terephthalate film to prepare a film having a thickness of 240 μm.

(Stretching Step)

This film was subjected to transverse uniaxial stretching at a stretching rate of 2.0 times, using a stretching machine in an air circulation type drying oven at 123° C.

(Shrinkage Step)

No shrinkage step was performed.

Comparative Example 4

A dope containing 12.6 weight parts of cellulose acetate propionate having an acetyl group substitution degree (degree of substitution with acetyl group) of 0.1, a propionyl group substitution degree (degree of substitution with propionyl group) of 2.6, and a number average molecular weight of 75000 (hereinafter referred to as "compound A"), 0.4 weight parts of ethylcellulose having an average substitution degree of 2.3, and a number average molecular weight is 51000 (hereinafter referred to as "compound B"), and 87 weight parts of methylene chloride, was prepared.

(Film Formation Step)

In an environment having a room temperature of 23° C. and a humidity of 15%, the above dope was cast on a 125 μm-thick biaxially-stretched PET film applied with a stress of 1.0× $10^6$N/m$^2$ in a direction of a long side thereof, in such a manner that a casting direction is coincident with the long side direction. Then, a resulting film was dried at the room temperature for 4 minutes, at 60° C. for 4 minutes and at 80° C. for 4 minutes. The dried layer was peeled from the PET film, and dried at 110° C. for 30 minutes, while being applied with a stress of 2.0×$10^5$ N/m$^2$ in the casting direction, to obtain a 220 μm-thick polymer film. The obtained film had a glass transition temperature (Tg) of 147° C.

(Stretching Step)

This film was subjected to transverse uniaxial stretching at a stretching rate of 2.0 times, using a stretching machine in an air circulation type drying oven at 155° C.

(Shrinkage Step)

No shrinkage step was performed.

Comparative Example 5

Except that, as a shrinkage step, the stretched film was subjected to shrinkage, firstly in an air circulation type drying oven at 113° C. (first shrinkage step), secondly in an air circulation type drying oven at 90° C. (second shrinkage step) and thirdly in an air circulation type drying oven at 70° C. (third shrinkage step), a retardation film was prepared in the same manner as that in Inventive Example 1.

[Evaluation]

For the retardation film obtained in each of the Inventive Examples 1 to 7 and Comparative Examples 1 to 5, the wavelength dispersion property ($Re_1[450]/Re_1[550]$), the in-plane birefringence ($\Delta n$) and the Nz coefficient were measured, and the wavelength dispersion change and the unevenness were evaluated. Results of the measurement and the evaluation are presented in Table 1.

TABLE 1

|  | Wavelength dispersion property | $\Delta n$ ($\times 10^{-3}$) | Wavelength dispersion change | Unevenness |
|---|---|---|---|---|
| Inventive Example 1 | 0.89 | 2.3 | 0.019 | ○ |
| Inventive Example 2 | 0.89 | 2.1 | 0.014 | ○ |
| Inventive Example 3 | 0.89 | 2.3 | 0.015 | ○ |
| Inventive Example 4 | 0.76 | 1.8 | 0.017 | ○ |
| Inventive Example 5 | 0.97 | 4.1 | 0.016 | ○ |
| Inventive Example 6 | 0.91 | 2.5 | 0.008 | ○ |
| Inventive Example 7 | 0.82 | 1.9 | 0.011 | ○ |
| Comparative Example 1 | 0.89 | 2.3 | 0.022 | × |
| Comparative Example 2 | 0.89 | 2.1 | 0.021 | × |
| Comparative Example 3 | 0.77 | 1.1 | 0.024 | × |
| Comparative Example 4 | 0.90 | 1.2 | 0.024 | × |
| Comparative Example 5 | 0.89 | 2.2 | 0.022 | × |

From the above results, it is understood that the present invention makes it possible to obtain a retardation film capable of avoiding the occurrence of position dependence of wavelength dispersion change even in a situation where it is exposed to high-temperature conditions for a long period of time, and, when the retardation film of the present invention is used in a polarizing plate, it becomes possible to obtain a display device having excellent long-term durability in terms of avoiding the occurrence of display unevenness.

Although the present invention has been fully described by way of a specific embodiment, it should be noted that the scope of the present invention is not limited to details of the illustrated embodiment, but should be determined by the appended claims and their legal equivalents.

INDUSTRIAL APPLICABILITY

The present invention makes it possible to obtain a retardation film capable of avoiding the occurrence of position dependence of wavelength dispersion change even in a situation where it is laminated onto glass through a pressure-sensitive adhesive and exposed to high-temperature conditions for a long period of time. Thus, when the retardation film of the present invention is used in a polarizing plate, it becomes possible to obtain a display device having excellent long-term durability in terms of avoiding the occurrence of display unevenness.

LIST OF REFERENCE SIGNS

1: polarizer
2, 2': arbitrary protective layer
3, 3': optical film
4: retardation film
11: polarizing plate
300: feeding section
310: aqueous iodine solution bath
320: bath of aqueous solution containing boric acid and potassium iodide
330: bath of aqueous solution containing potassium iodide
340: drying means
350: polarizer
360: take-up section

The invention claimed is:

1. A method of producing a retardation film containing a long polymer film which satisfies the following formulas (1) and (2):

$$0.7 < Re1[450]/Re1[550] < 0.97 \quad (1); \text{ and}$$

$$1.5 \times 10-3 < \Delta n < 6.0 \times 10-3 \quad (2)$$

where: Re1[450] and Re1[550] represent, respectively, in-plane retardation values of the retardation film as measured with light of a wavelength of 450 nm and light of a wavelength of 550 nm, at 23° C.; and $\Delta n$ represents an in-plane birefringence of the retardation film as measured with light of a wavelength of 550 nm, the method comprising:
continuously conveying and supplying the long polymer film;
stretching the polymer film in a direction transverse to a conveyance direction;
shrinking the polymer film in the transverse direction at a first shrinkage temperature T1 (° C.); and
shrinking the polymer film to shrink in the transverse direction at a second shrinkage temperature T2 (° C.),
wherein the first shrinkage temperature T1 (° C.) and the second shrinkage temperature T2 (° C.) satisfy the following formula (3):

$$1 < (T1-T_2) \leq 10 \quad (3).$$

2. The method as defined in claim 1, which further comprises shrinking the polymer film in the transverse direction at a shrinkage temperature T3 (° C.),
wherein the shrinkage temperature T2 (° C.) and the shrinkage temperature T3 (° C.) satisfy the following formula (4):

$$1 < (T_2-T_3) \leq 10 \quad (4).$$

3. The method as defined in claim 1, wherein the polymer film is stretched at a stretching temperature T0 (° C.), which satisfies the following formula (5):

$$0 \leq (T0-T1) \leq 10 \quad (5).$$

4. The method as defined in claim 1, wherein each of the shrinkage temperature T1 (° C.), the shrinkage temperature T2 (° C.) and the shrinkage temperature T3 (° C.) satisfies the following formula (6):

$$(T_g-20) < T < (T_g+3) \quad (6)$$

(where: Tg represents a glass-transition temperature of the polymer film; and T represents T1, T2 or T3).

5. A retardation film obtained by the method as defined in claim 1, wherein the retardation film satisfies the following formula (7):

$$2° < (\text{a maximum value of an orientation angle} - \text{a minimum value of the orientation angle}) < 10° \quad (7).$$

6. A retardation film obtained by the method as defined in claim 1, wherein the retardation film satisfies the following formula (8):

$$|Re1[450]/Re1[550] - Re2[450]/Re2[550]| < 0.02 \quad (8)$$

where: $Re_1[450]$ and $Re_1[550]$ represent, respectively, the in-plane retardation values of the retardation film as measured with said light of a wavelength of 450 nm and said light of a wavelength of 550 nm, at 23° C.; and $Re_2[450]$ and $Re_2[550]$ represent, respectively, the in-plane retardation values of the retardation film as measured with said light of a wavelengths of 450 nm and said light of a wavelength of 550 nm, at 23° C., and after subjecting the retardation film to a heat treatment at 90° C. for 100 hours.

7. A retardation film which satisfies the following formulas (1), (2) and (8):

$$0.7 < Re1[450]/Re1[550] < 0.97 \quad (1)$$

$$1.5 \times 10^{-3} < \Delta n < 6.0 \times 10^{-3} \quad (2)$$

$$|Re1[450]/Re1[550] - Re2[450]/Re2[550]| < 0.02 \quad (8)$$

where: $Re_1[450]$ and $Re_1[550]$ represent, respectively, in-plane retardation values of the retardation film as measured with light of a wavelength of 450 nm and light of a wavelength of 550 nm, at 23° C.; $\Delta n$ represents an in-plane birefringence of the retardation film as measured with light of a wavelength of 550 nm; and $Re_2[450]$ and $Re_2[550]$ represent, respectively, in-plane retardation values of the retardation film as measured with light of a wavelength of 450 nm and light of a wavelength of 550 nm, at 23° C., and after subjecting the retardation film to a heat treatment at 90° C. for 100 hours.

8. The retardation film as defined in claim 7, which satisfies the following formula (7):

$$2° < (\text{a maximum value of an orientation angle} - \text{a minimum value of the orientation angle}) < 10° \quad (7).$$

9. The retardation film as defined in claim 7, which contains a polymer material including, as a primary component, a polymer comprising a main chain having a stretch-orientation property and a side chain comprised of a unit having an absorption edge at a wavelength of 260 to 380 nm, wherein a plane of the side chain intersects with a direction along which the main chain extends.

10. A polarizing plate comprising the retardation film as defined in claim 7, and a polarizer.

11. A display device comprising the polarizing plate as defined in claim 10.

* * * * *